United States Patent [19]

Anderson et al.

[11] 4,051,105
[45] Sept. 27, 1977

[54] PLASTIC COMPOSITIONS

[75] Inventors: Arnold L. Anderson; Robert J. Nulph, both of Alma, Mich.

[73] Assignee: Velsicol Chemical Corporation, Chicago, Ill.

[21] Appl. No.: 330,837

[22] Filed: Feb. 8, 1973

Related U.S. Application Data

[63] Continuation-in-part of Ser. No. 260,240, June 6, 1972, abandoned.

[51] Int. Cl.$^2$ .................. C08L 25/10; C08L 25/12
[52] U.S. Cl. .................. 260/45.95 G; 260/45.75 R; 260/45.75 W; 260/45.75 D; 260/45.75 B
[58] Field of Search .................. 260/45.95 G, 613 B, 260/33.2 R, 2.5 AJ, DIG. 24; 106/15 FP

[56] References Cited

U.S. PATENT DOCUMENTS

| | | | |
|---|---|---|---|
| 3,658,634 | 4/1972 | Yanagi et al. | 161/403 |
| 3,717,609 | 2/1973 | Kutner | 260/45.95 G |

*Primary Examiner*—M. J. Welsh
*Attorney, Agent, or Firm*—Robert M. Phipps; James J. Mullen

[57] ABSTRACT

Plastic compositions containing an acrylonitrile-butadiene-styrene polymer and bis-phenoxy compounds having the formula

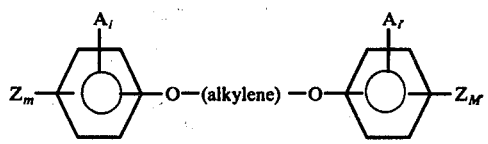

wherein Z is bromine, m is an integer having a value of 1-5 and m' is an integer having the value of 0-4, i is an integer having a value of 0-2 and i' is an integer having a value of 1-5, alkylene is a straight or branched chain alkylene group having from 1 to 6 carbon atoms and A is chlorine.

14 Claims, No Drawings

PLASTIC COMPOSITIONS

This application is a continuation-in-part of copending application Ser. No. 260,240, filed June 6, 1972 and now abandoned. The entire specification of this case, Ser. No. 260,240, is to be considered as incorporated herein by reference.

The prior art considered in conjunction with the preparation of this application is as follows: U.S. Pat. Nos. 2,130,990; 2,186,367; 2,329,033; 3,666,692; 3,686,320; 3,658,634; German Pat. No. 1,139,636; German Pat. No. 2,054,522; Japanese Pat. No. (72) 14,500 as cited in Volume 77, Chemical Abstracts, column 153737k (1972); Chemical Abstracts, Volume 13, column 448[5]; Chemical Abstracts, Volume 31, column 7045[9]; and Journal of the Chemical Society, pages 2972-2976 (1963). All of these publications are to be considered as incorporated herein by reference.

The present invention relates to plastic compositions containing acrylonitrile-butadiene-styrene polymers (herein referred to as ABS). More specifically, the present invention covers plastic compositions containing ABS and certain bis-phenoxy compounds (hereinafter defined) as flame retardants for said plastic compositions.

ABS plastics and utility thereof are known in the art as exemplified by *ABS Plastics*, C. H. Basdekis, (Reinhold Plastics Applications Series), Reinhold Publishing Corporation, New York, 1964 and *Modern Plastics Encyclopedia* 1972-1973, Vol. 49: No. 10A, October, 1972, pages 10, 14, 16, 17, 19, 142 and 143 and which publications are in toto incorporated herein by reference.

The need for flame retarding ABS plastics has also been recognized in the art as exemplified by U.S. Pat. Nos. 3,422,048 and 3,418,263 and Modern Plastics Encyclopedia, ibid, pages 142, 143, 202, 203 and 456-458 and which publications are in toto incorporated herein by reference.

The resultant disadvantages in the utilization of various prior art materials as flame retardants for ABS include, without limitation, factors such as thermal migration, heat instability, light instability, non-biodegradable, toxicity, discoloration and the large amounts employed in order to be effective. Thus, there is always a demand for a material which will function as a flame retardant in ABS and concurrently will not, by incorporation therein, adversely effect the chemical and/or physical and/or mechanical properties of the resultant ABS plastic composition.

The prior art problem of providing a flame retarded ABS composition having desired chemical, physical and mechanical properties has now been substantially solved by the present invention and the above-described disadvantages substantially overcome.

Accordingly, one of the main objects of the present invention is to provide ABS plastic compositions which are flame retarded.

Another object of the present invention is to provide a material for ABS plastic compositions which will not substantially adversely effect the chemical and/or physical and/or mechanical properties of said compositions.

A further object of the present invention is to provide a flame retardant which is economic and easy to incorporate into ABS plastics without being degraded or decomposed as a result of blending or processing operations.

It has been found that the foregoing objects can be obtained by the incorporation of a new class of bis-phenoxy compounds in acrylonitrile-butadiene-styrene polymer to subsequently provide flame retarded compositions which exhibit outstanding chemical, physical and mechanical properties.

The bis-phenoxy compounds used in the present invention compositions have the formula:

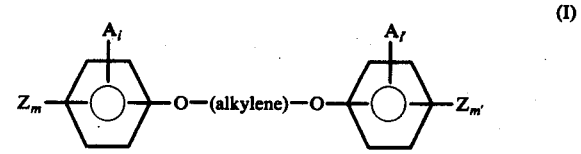

(I)

In Formula I above, Z is bromine; $m$ is an integer having a value of 1-5 and $m'$ is an integer having a value of 0-4; $i$ is an integer having a value of 0-2 and $i'$ is an integer having a value of 1-5; alkylene is a straight or branched chain alkylene group having from 1 to 6 carbon atoms (e.g. $CH_2$, $C_2H_4$, $C_3H_6$, $C_4H_8$, $C_5H_{10}$, $C_6H_{12}$ and $CH_2CH(CH_3)CH_2$; and A is chlorine.

It is to be understood that all of the compounds falling within the above Formula I and as heretofore defined are generically described herein as "bis-phenoxy" compounds.

Illustrative (but without limitation) of some of the present invention bis-phenoxy compounds are shown below:

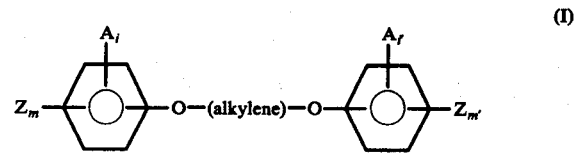

(I)

the exemplary definitions of A, Z, $i$, $i'$, $m$, $m'$ and alkylene are listed in Table I.

Table I

| Compound No. | Z | m | m' | A | i | i' | Alkylene |
|---|---|---|---|---|---|---|---|
| 1 | Br | 2 | 2 | Cl | 1 | 1 | $CH_2$ |
| 2 | Br | 2 | 2 | Cl | 1 | 1 | $C_2H_4$ |
| 3 | Br | 2 | 2 | Cl | 1 | 1 | $C_3H_6$ |
| 4 | Br | 3 | 0 | Cl | 0 | 5 | $C_2H_4$ |
| 5 | Br | 3 | 0 | Cl | 0 | 5 | $C_3H_6$ |
| 6 | Br | 3 | 0 | Cl | 0 | 5 | $C_4H_3$ |
| 7 | Br | 3 | 3 | Cl | 1 | 1 | $C_4H_8$ |
| 8 | Br | 2 | 2 | Cl | 2 | 2 | $C_3H_6$ |
| 9 | Br | 2 | 2 | Cl | 2 | 2 | $C_4H_8$ |
| 10 | Br | 5 | 0 | Cl | 0 | 5 | $C_2H_4$ |
| 11 | Br | 5 | 0 | Cl | 0 | 5 | $C_4H_8$ |
| 12 | Br | 2 | 2 | Cl | 1 | 1 | $C_6H_{12}$ |
| 13 | Br | 3 | 0 | Cl | 0 | 5 | $C_6H_{12}$ |
| 14 | Br | 4 | 1 | Cl | 1 | 4 | $C_2H_4$ |
| 15 | Br | 3 | 3 | Cl | 1 | 1 | $C_3H_6$ |
| 16 | Br | 3 | 3 | Cl | 1 | 1 | $C_6H_{12}$ |
| 17 | Br | 2 | 2 | Cl | 2 | 2 | $C_2H_4$ |
| 18 | Br | 4 | 4 | Cl | 1 | 1 | $C_3H_6$ |
| 19 | Br | 3 | 3 | Cl | 1 | 1 | $C_2H_4$ |
| 20 | Br | 3 | 3 | Cl | 2 | 2 | $C_3H_6$ |
| 21 | Br | 2 | 2 | Cl | 1 | 1 | $CH(CH_3)CH_2$ |
| 22 | Br | 4 | 4 | Cl | 1 | 1 | $CH(CH_3)CH_2CH_2$ |
| 23 | Br | 3 | 3 | Cl | 2 | 2 | $CH_2CH(CH_3)CH_2CH$ |
| 24 | Br | 1 | 1 | Cl | 1 | 1 | $CH_2$ |
| 25 | Br | 1 | 1 | Cl | 1 | 1 | $C_2H_4$ |

In general, the bis-phenoxy compounds are prepared by reacting a halogenated phenol with a halogenated alkane at elevated temperatures in the presence of a basic material such as alkali metal hydroxides, carbonates, bicarbonates, oxides and hydrides. The preferred alkali metals are potassium and sodium. Where one desires to increase, for example, ease of handling the reaction mass, solvents such as ketones (e.g. acetone, methyl ethyl ketone, and methyl iso-butyl ketone), alcohols (e.g. methanol, ethanol, iso-propyl alcohol, butyl alcohol and glycols), or aqueous solvents (e.g. water, a mixture of water and alcohol and a mixture of water and ketone) can be employed. The desired end product, i.e. the bis-phenoxy compound, can be recovered from the reaction mass via various methods such as distillation or crystallization. Where the end product requires recovery via crystallization, various aromatic solvents such as benzene, toluene, xylene, dichlorobenzene and the like can be used.

Specifically, the bis-phenoxy compounds are prepared according to the following reactions:

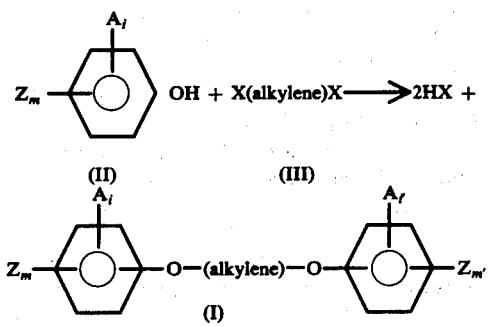

In the above reaction, X is halogen, preferably chlorine and alkylene is the same as herein defined. Where $m$ and $m'$ and $i$ and $i'$ are different integers, then equivalent molar portions of the particular halogenated phenol are used with equivalent portions of dissimilar halogenated phenol.

The above reaction is conducted at temperatures ranging from the freezing point of the initial reaction mass to the boiling point thereof. Preferably the temperatures are from about 40° to about 200° C and more preferably from about 50° to about 175° C. It is to be understood that the reaction can be conducted under sub-atmospheric (e.g. 1/10-8/10 atmospheres), atmospheric or super-atmospheric (e.g. 1.5-10 atmospheres) pressure. Preferably, the reaction is carried out at atmospheric pressure.

The above-described processes can be carried out with conventional, readily available chemical processing equipment. For example, a conventional glass-lined vessel provided with heat transfer means, a reflux condenser and a mechanical stirrer can be advantageously utilized in practicing any of the preferred embodiments of the invention described in the examples set forth herein.

The amount of bis-phenoxy compound employed in the present invention compositions is any quantity which will effectively render the acrylonitrile-butadiene-styrene polymer containing composition flame retardant. In general, the amount used is from about 1% to 25% by weight, based on the total weight of the composition. Preferably, the amount employed is from about 5% to about 20% by weight. It is to be understood that any amount can be used as long as it does not substantially adversely effect the chemical and/or physical and/or mechanical properties of the end polymer composition. The amount utilized, however, is such amount which achieves the objectives described herein.

It is to be understood that the term ABS as used herein means acrylonitrile-butadiene-styrene copolymers which are thermoplastic polymers produced, for example (but without limitation), by blending a styrene/acrylonitrile copolymer with butadiene-based rubber, or by grafting butadiene-based rubber (usually polybutadiene) with styrene/acrylonitrile chains, or by copolymerization of styrene, acrylonitrile and butadiene monomers. Thus the acrylonitrile-butadiene-styrene polymer used in the present invention compositions is any acrylonitrile-butadiene-styrene polymer herein defined and which one so desires to flame retard. It is to be understood that the acrylonitrile-butadiene-styrene polymer used can be a "virgin" material, i.e. substantially free of additives such as stabilizers, plasticizers, dyes, pigments, fillers, and the like, or the acrylonitrile-butadiene-styrene polymer can have additives (such as those mentioned and described herein) already contained therein or added concurrently with or after the addition of the bis-phenoxy compounds. Another facet of the present invention relates to the use of certain metal compounds with the bis-phenoxy compounds to promote a cooperative effect therebetween and thus enhance the flame retardancy of the resultant plastic composition as compared to the flame retardancy of either one component used separately. These "enhancing agents" are from the group antimony, arsenic, bismuth, tin and zinc-containing compounds. Without limitation, examples of said enhancing agents include $Sb_2O_3$, $SbCl_3$, $SbBr_3$, $SbI_3$, $SbOCl$, $As_2O_3$, $As_2O_5$, $ZnBO_4$, $BaB_2O_4.H_2O$, $2.ZnO.3B_2O_3.3.5H_2O$ and stannous oxide hydrate. The preferred enhancing agent is antimony trioxide.

The amount of enhancing agent employed in the present invention compositions is any amount which when used with said bis-phenoxy compounds will promote a cooperative effect therebetween. In general, the amount employed is from about 1% to about 15%, preferably from about 2% to about 10%, by weight, based on the total weight of plastic composition. Higher amounts can be used as long as the desired end result is achieved. It is also within the scope of the present invention to employ other materials in the present invention compositions where one so desires to achieve a particular end result. Such materials include, without limitation, adhesion promotors; antioxidants; antistatic agents; antimicrobials; colorants; flame retardants such as those listed on pages 456–458, Modern Plastics Encyclopedia, ibid, (in addition to the new class of flame retardants described herein); heat stabilizers; light stabilizers; pigments; plasticizers; preservatives; ultraviolet stabilizers and fillers.

In this latter category, i.e. fillers, there can be mentioned without limitation, materials such as glass; carbon; cellulosic fillers (wood flour, cork and shell flour); calcium carbonate (chalk, limestone, and precipitated calcium carbonate); metal flakes; metallic oxides (aluminum, beryllium oxide and magnesia); metallic powders (aluminum, bronze, lead, stainless steel and zinc); polymers (comminuted polymers and elastomer-plastic blends); silica products (diatomaceous earth, novaculite, quartz, sand, tripoli, fumed colloidal silica, silica aerogel, wet process silica); silicates (asbestos, kaolimite, mica, nepheline syenite, talc, wollastonite, aluminum silicate and calcium silicate); and inorganic compounds such as barium ferrite, barium sulfate, molybdenum disulfide and silicon carbide.

The above mentioned materials, including fillers, are more fully described in Modern Plastics Encyclopedia, ibid, and which publication is incorporated herein (in toto) by reference.

The amount of the above described materials employed in the present invention compositions can be any quantity which will not substantially adversely effect the desired results derived from the present invention compositions. Thus, the amount used can be zero (0) percent, based on the total weight of the composition, up to that percent at which the composition can still be classified as a plastic. In general, such amount will be from about 0% to about 75% and specifically from about 1% to about 50%.

The bis-phenoxy compounds can be incorporated into the acrylonitrile-butadiene-styrene at any processing stage in order to prepare the present invention compositions. In general, this is undertaken prior to fabrication either by physical blending or during the process of forming acrylonitrile-butadiene-styrene polymer per se. Where one so desires, the bis-phenoxy compounds may be micronized into finely divided particles prior to incorporation into the acrylonitrile-butadiene-styrene polymer.

EXAMPLE I

An ABS plastic material, (Marbon TP-2098, a product of Marbon Division, Borg-Warner Corporation, Washington, West Virginia and containing antioxidants, lubricants, releasing agents and titanium dioxide pigment and prepared according to the processes described and claimed in U.S. Pat. No. 3,238,275 issued on Mar. 1, 1966) is utilized as the base resin in order to prepare 26 formulations (plastic compositions). With the exception of formulation No. 1, the particular bis-phenoxy compound (and the antimony trioxide enhancing agent where indicated) is incorporated into the plastic by adding both to a Brabender mixer ("Plastic-Corder", Torque Rheometer, Model PLV-150, C. W. Brabender Instruments Inc., South Hackensack, N.J.). The mixer is equipped with a pair of roller type blades positioned within a head provided with heat transfer means.

The resultant mixture is heated to about 245° C.; at this temperature, it is in a molten state. The percentages by weight of each component utilized in the respective formulations are listed in Table II. Each formulation is discharged from the mixer and upon cooling solidifies and is ground into chips. The chips are subjected to compression molding in a Wabash press by placing said chips between two platens, the bottom of which contains four equal size depressions 3 inches by 5 inches by ⅛ inch deep. The top platen is then placed over the bottom platen and heat transfer means supplied thereto in order to melt said chips and thus provide solid samples (after cooling) for testing.

Portions of the solid samples of each respective formulation (Nos. 1–26) prepared according to the above described procedure are then subjected to two different standard flammability tests, i.e. UL 94 and ASTM D-2863-70. The UL 94 is, in general, the application of a burner to a test specimen (strip) for a certain period of time and observation of combustion, burning, and extinguishment. This procedure is fully set forth in Underwriters' Laboratories bulletin entitled UL 94, Standard for Safety, First Edition, September 1972 and which is incorporated herein by reference. ASTM No. D-2863-70 is a flammability test which correlates the flammability of a plastic specimen to the available oxygen in its immediate environment; this correlation is stated as an Oxygen Index, O.I., level predicated upon the percent oxygen in the gaseous medium which is required to just provide a steady state of continuous burning of the plastic specimen. This ASTM method is fully described in 1971 Annual Book of ASTM Standards — Part 27, published by the American Society For Testing and Materials, 1916 Race Street, Philadelphia, Pa.; this publication is to be considered as incorporated (in toto) herein by reference.

The results of these flammability tests are shown in Table II.

TABLE II

FLAMMABILITY DATA FOR ABS PLASTIC COMPOSITIONS CONTAINING BIS-PHENOXY COMPOUNDS

| FORMULATION NO. | BIS-PHENOXY NO. | COMPOUND % | ENHANCING AGENT $Sb_2O_3$, % | OXYGEN INDEX % | UL 94 |
|---|---|---|---|---|---|
| 1. | — | 0 | 0 | 18.5 | SB |
| 2. | 5 | 15 | 0 | 22.0 | SB |
| 3. | 5 | 15 | 5 | 30.5 | SE-2 |
| 4. | 7 | 15 | 0 | 24.5 | SB |
| 5. | 7 | 15 | 5 | 34.0 | SE-1 |
| 6. | 9 | 15 | 0 | 20.5 | SB |
| 7. | 9 | 15 | 5 | 28.5 | SE-2 |
| 8. | 10 | 15 | 0 | 23.0 | SB |
| 9. | 10 | 15 | 5 | 31.0 | SE-2 |
| 10. | 14 | 15 | 0 | 24.0 | SB |
| 11. | 14 | 15 | 5 | 31.5 | SE-2 |
| 12. | 15 | 15 | 0 | 23.5 | SB |
| 13. | 15 | 15 | 5 | 30.0 | SE-2 |
| 14. | 17 | 15 | 0 | 23.5 | SB |
| 15. | 17 | 15 | 5 | 33.5 | SE-1 |
| 16. | 18 | 15 | 0 | 25.0 | SB |
| 17. | 18 | 15 | 5 | 36.0 | SE-0 |
| 18. | 19 | 15 | 0 | 22.5 | SB |
| 19. | 19 | 15 | 5 | 29.5 | SE-2 |
| 20. | 21 | 15 | 0 | 23.5 | SB |
| 21. | 21 | 15 | 5 | 32.0 | SE-1 |
| 22. | 23 | 15 | 0 | 25.0 | SB |
| 23. | 23 | 15 | 5 | 34.5 | SE-1 |
| 24. | 1 | 15 | 0 | 21.5 | SB |
| 25. | 1 | 15 | 5 | 28.0 | |
| 26. | 3 | 15 | 5 | 28.5 | |

Referring to Table II, the bis-phenoxy compound number relates to the structural formulae heretofor set forth in Table I; a difference of 2% in the Oxygen Index values is considered significant; and the UL 94 values are on a graduated scale wherein the highest degree to lowest degree of flame retardancy is respectively SE-0, SE-1, SE-2, SB and Burns.

The results shown in Table II demonstrate the unique effectiveness of these bis-phenoxy compounds as flame retardants for ABS. Specifically, formulation No. 1 (the control) had a O.I. of 18.5 and UL 94 value of SB. In Nos. 2, 4, 6, 8, 10, 12, 14, 16, 18, 20, 22 and 24, the use of the particular bis-phenoxy compound results in a significant increase (2–6.5%) in fire retardancy as measured by O.I. (While these formulations also had a SB rating, UL 94, the individual U.L. rating has a wide range of values and thus the O.I. number is, in this case, more indicative of increased flame retardancy).

The use of an enhancing agent such as $Sb_2O_3$ to promote a cooperative effect between such agent and the bis-phenoxy compound is fully demonstrated via the results obtained from testing formulation Nos. 3, 5, 7, 9, 11, 13, 15, 17, 19, 21, 23, 25 and 26. The highest UL 94 ratings and significantly higher O.I. values (10–17.5% increase) are obtained.

EXAMPLE II

Example I is repeated twice, once using a 10% bis-phenoxy compound level and 3% $Sb_2O_3$ level and secondly, 20% and 10% levels respectively. At the 10%/3% level, the O.I. values and UL 94 ratings are slightly lower than the 15%/5% level of Example I. At the 20%/10% levels, the O.I. values and UL 94 ratings are slightly higher but basically the same as those obtained using the 15%/5% level.

EXAMPLE III

Portions of the solid samples of Formulation Nos. 1–26 prepared according to the above described procedure of Example I are subjected to the following ASTM tests in order to ascertain other properties of the resultant plastic composition:

| | | |
|---|---|---|
| (1) | Tensile Strength (at break) | ASTM Test No. D638-61T; |
| (2) | Flexural Strength | ASTM Test No. D790-63; |
| (3) | Flexural Modulus | ASTM Test No. D790-63; |
| (4) | Notched Izod Impact | ASTM Test No. D256-56; and |
| (5) | Heat Distortion Temperature (HDT) | ASTM Test No. D648-56. |

Each of the aforementioned ASTM Tests are standard tests in the art and are utilized collectively in order to ascertain the efficacy of a polymeric system as an overall flame retarded composition for commercial application. All of these ASTM Tests are to be considered as incorporated herein by reference.

The results of these ASTM tests show that the physical properties of the present invention compositions are basically the same (except O.I. and UL 94 values) as the plastic material without the flame retardant (i.e. formulation No. 1). Thus, there is no substantial adverse effect on the physical properties of the plastic material when the novel compounds are incorporated therein.

EXAMPLE IV

The procedure of Examples I and III are repeated except that the enhancing agent used is zinc borate instead of $Sb_2O_3$. Substantially the same results are obtained using zinc borate as those obtained using $Sb_2O_3$.

EXAMPLE V

Strip samples of each of Formulation Nos. 1 through 26 Table III, are subjected to light stability tests via the use of a "Weather-Ometer", model 25/18 W. R., Atlas Electrical Devices Company, Chicago, Illinois. Utilizing an operating temperature of 145° F and a 50% relative humidity, each strip is subjected to 200 hours of "simulated daylight" via the use of a carbon arc. The results show that after 200 hours, there is no significant discoloration in any strip tested and which demonstrates that the present invention compositions are highly resistant to deterioration by light.

EXAMPLE VI

Samples of each of Formulation Nos. 1 through 26 Table II, are subjected to temperature (thermal) stability tests via the use of thermal gravimetric analysis (TGA). This test employed the use of a "Thermal Balance", model TGS-1, Perkin-Elmer Corporation, Norwalk, Conn. and an electrical balance, Cahn 2580 model, Cahn Instrument Company, Paramount, Calif. The resuls of these tests show that the bis-phenoxy compounds containing Formulations had more than adequate stability for melt processing and subsequent heat aging ((i.e. high temperature applications) and thus demonstrating that the particular bis-phenoxy compounds are quite compatible with the plastic material. The bis-phenoxy compound stability thus aids in providing sufficient flame retardancy at the plastic decomposition temperature. This test also demonstrates that these compounds do not exhibit migration.

In view of the foregoing Examples and remarks, it is seen that the plastic compositions, which incorporate these compounds, possess characteristics which have been unobtainable in the prior art. Thus, the use of these compounds in the above described plastic material as flame retardants therefor is quite unique since it is not possible to predict the effectiveness and functionality of any particular material in any polymer system until it is actively undergone incorporation therein and the resultant plastic composition tested according to various ASTM Standards. Furthermore, it is necessary, in order to have commercial utility, that the resultant flame retarded plastic composition possess characteristics such as being non-toxic. Use of these compounds in the plastic material has accomplished all of these objectives.

The above examples have been described in the foregoing specification for the purpose of illustration and not limitation. Many other modifications and ramifications will naturally suggest themselves to those skilled in the art based on this disclosure. These are intended to be comprehended as within the scope of this invention.

What is claimed is:

1. A Plastic composition comprising acrylonitrile-butadiene-styrene polymer and a flame retardant, said flame retardant consisting of a compound having the formula

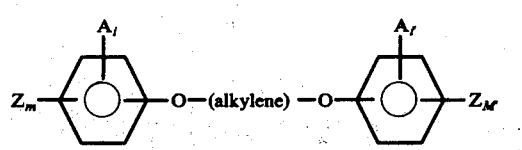

wherein Z is bromine; m is an integer having a value of 1–5 and m' is an integer having a value of 0–4; i is an integer having a value of 0–2 and $i'$ is an integer having a value of 1–5; alkylene is a straight or branched chain alkylene group having from 1 to 6 carbon atoms; and A is chlorine.

2. The composition as set forth in claim 1 wherein $i$ is 0 and $m'$ is 0.

3. The composition as set forth in claim 1 wherein $i$ and $i'$ are both 1.

4. The composition as set forth in claim 2 wherein A is $CH_2$.

5. The composition as set forth in claim 2 wherein A is $C_2H_4$.

6. The composition as set forth in claim 2 wherein A is $C_3H_6$.

7. The composition as set forth in claim 2 wherein A is $C_4H_8$.

8. The composition as set forth in claim 5 wherein $m$ and $m'$ are both 2 and $i$ and $i'$ are both 1.

9. The composition as set forth in claim 6 wherein $m$ and $m'$ are both 2 and $i$ and $i'$ are both 1.

10. The composition as set forth in claim 7 wherein $m$ and $m'$ are both 2 and $i$ and $i'$ are both 1.

11. The composition as set forth in claim 4 wherein $m$ is 3, $i$ is 0, $m'$ is 0 and $i'$ is 5.

12. The composition as set forth in claim 5 wherein $m$ is 3, $i$ is 0, $m'$ is 0 and $i'$ is 5.

13. The composition as set forth in claim 6 wherein $m$ is 3, $i$ is 0, $m'$ is 0 and $i'$ is 5.

14. The composition as set forth in claim 7 wherein $m$ is 3, $i$ is 0, $m'$ is 0 and $i'$ is 5.

* * * * *

UNITED STATES PATENT OFFICE
CERTIFICATE OF CORRECTION

PATENT NO. : 4,051,105
DATED : September 27, 1977
INVENTOR(S) : Arnold L. Anderson It is certified that error appears in the above-identified patent and that said Letters Patent are hereby corrected as shown below:

Data (cover) Page, left column, after item [73] insert section:

[*] Notice: The portion of the term of this patent subsequent to August 30, 1994, has been disclaimed.

Claims 4 through 7 (at Columns 9 and 10), Line 1, after wherein delete "A" and insert -- alkylene --

Signed and Sealed this

Twenty-fourth Day of October 1978

[SEAL]

Attest:

RUTH C. MASON
Attesting Officer

DONALD W. BANNER
Commissioner of Patents and Trademarks